United States Patent
Casagrande (10) Patent No.: US 7,197,144 B1
(45) Date of Patent: Mar. 27, 2007

(54) METHOD AND APPARATUS TO AUTHENTICATE A USER'S SYSTEM TO PREVENT UNAUTHORIZED USE OF SOFTWARE PRODUCTS DISTRIBUTED TO USERS

(75) Inventor: Steven Casagrande, Arlington, MA (US)

(73) Assignee: Ethos Technologies, Inc., Arlington, MA (US)

( * ) Notice: Subject to any disclaimer, the term of this patent is extended or adjusted under 35 U.S.C. 154(b) by 1033 days.

(21) Appl. No.: 09/590,859

(22) Filed: Jun. 8, 2000

Related U.S. Application Data (60) Provisional application No. 60/138,052, filed on Jun. 8, 1999.

(51) Int. Cl.
*H04L 9/00* (2006.01)

(52) U.S. Cl. .............. 380/262; 713/171; 713/172; 705/59

(58) Field of Classification Search ............ 713/201, 713/171, 172; 705/59; 380/262
See application file for complete search history.

(56) References Cited

U.S. PATENT DOCUMENTS

| | | | | |
|---|---|---|---|---|
| 4,562,342 A | * | 12/1985 | Solo ........................ 235/380 |
| 4,712,214 A | | 12/1987 | Meltzer ..................... 371/32 |
| 4,757,534 A | * | 7/1988 | Matyas et al. .............. 705/56 |
| 5,267,235 A | | 11/1993 | Thacker ..................... 370/60 |
| 5,379,342 A | * | 1/1995 | Arnold et al. ............... 380/2 |
| 5,396,613 A | | 3/1995 | Hollaar ..................... 395/575 |
| 5,495,610 A | | 2/1996 | Shing ....................... 395/600 |
| 5,506,958 A | | 4/1996 | Myran ................... 395/182.16 |
| 5,553,083 A | | 9/1996 | Miller ....................... 371/32 |
| 5,583,563 A | | 12/1996 | Wanderscheid ............. 348/13 |
| 5,604,803 A | * | 2/1997 | Aziz ........................ 713/155 |
| 5,638,299 A | | 6/1997 | Miller ....................... 364/550 |
| 5,673,252 A | | 9/1997 | Johnson .................... 370/94.1 |
| 5,696,898 A | | 12/1997 | Baker ..................... 395/187.01 |

(Continued)

FOREIGN PATENT DOCUMENTS

WO        98/42098        9/1998

(Continued)

OTHER PUBLICATIONS

BestCrypt Data Protection and Access Restriction System Help File, Aug. 14, 1996.

(Continued)

*Primary Examiner*—Gilberto Barron
*Assistant Examiner*—Jung Kim (57) ABSTRACT

A system for providing protection against pirating of software product or products or any other digital information being sent over the Internet, or by physical means, to a computer system. The system generates a set of parameters associated to the authorized user's system and uses those parameters to form a value. Then the invention encrypts that value leaving a set of encrypted forms of the value. The set of encrypted values is then sent to the user's system. The original set of parameters are again generated on the user's system and used to decrypt the set of encrypted values sent to the user. If the result of this decryption yields a minimum number of identical values, a quorum is deemed reached, and the invention allows the user to access to the software product. The software product also may have been encrypted using the initial formed value. Thus, if the quorum is reached, the resultant most identical value will be the initial value formed by the invention, and will then successfully decrypt the encrypted software product.

8 Claims, 9 Drawing Sheets

U.S. PATENT DOCUMENTS

| | | | | |
|---|---|---|---|---|
| 5,699,513 | A | | 12/1997 | Feigen ................... 395/187.01 |
| 5,721,824 | A | | 2/1998 | Taylor ................... 395/200.33 |
| 5,991,402 | A | | 11/1999 | Jia et al. |
| 6,026,166 | A | * | 2/2000 | LeBourgeois ............... 713/156 |
| 6,049,612 | A | * | 4/2000 | Fielder et al. ................ 380/44 |
| 6,049,892 | A | | 4/2000 | Casagrande ................. 714/18 |
| 6,108,420 | A | * | 8/2000 | Larose et al. ................ 705/59 |
| 6,212,635 | B1 | * | 4/2001 | Reardon ..................... 713/165 |
| 6,240,513 | B1 | * | 5/2001 | Friedman et al. ........... 713/152 |

FOREIGN PATENT DOCUMENTS

| | | | |
|---|---|---|---|
| WO | WO 98/42098 | * | 9/1998 |
| WO | 98/44402 | | 10/1998 |
| WO | 98/45768 | | 10/1998 |

OTHER PUBLICATIONS

Manual for Security Card Lite, Dec. 18, 1996.
Decros, Protect95 User's Guide, Nov. 13, 1997.
BestCrypt Control Panel Help Index, May 18, 1999.

* cited by examiner

METHOD AND APPARATUS TO AUTHENTICATE A USER'S SYSTEM TO PREVENT UNAUTHORIZED USE OF SOFTWARE PRODUCTS DISTRIBUTED TO USERS

RELATED APPLICATIONS

Priority is claimed under 35 U.S.C. paragraph 119(e) for the present invention from a provisional application Ser. No. 60/138,052, filed Jun. 8, 1999, by the same inventor and of the same title and ownership.

FIELD OF THE INVENTION

The present invention relates to a system that thwarts the pirating of digital products, thereby providing a means for enforcing license agreements and their copyright terms. The invention provides a more secure method to ensure that only authorized users acquire and have the ability to use the software digital products. Moreover, the invention is invisible to the user, thus requiring no manual steps, making the invention user-friendly.

BACKGROUND OF THE INVENTION

Unlicensed users of software applications, and the distribution of software applications to unlicensed users, both refer to and are examples of software piracy.

Software licenses only allow registered users to access the application. Typically, the legal terms in such licenses are such that copying a software application from a registered user's computer, and executing that application on an unregistered user's computer violates the license. Worldwide, it has been reported that more than 40% of all software in use is illegally copied. In 1997, piracy cost the software industry $11.4 billion in lost revenues. That translates into fewer jobs, less innovation, higher costs for consumers, and lost revenue for the software owners.

Abstracting to more general terms, the piracy of any 'software products' (for example an executable, data file(s), or streaming data; such as source and intermediate and executable code, software games, graphics, and Internet distributed movies & music) is an ever growing and costly problem for both industry and consumer markets alike. The piracy of software products (herein applications) has seen unprecedented growth in recent years with the advent and use of the Internet (particularly the World Wide Web) to distribute illegally pirated applications. Such pirating is a costly and growing problem for both the industries affected and the consumers.

Overview of Current Anti-Pirate Systems

Methods to protect applications from piracy exist, and fall into one of two categories: software methods and hardware methods. Hardware methods are more common, but are very impractical in today's dynamic markets where vendors wish to distribute applications both electronically and physically. There are very few software methods for protecting applications from piracy. Examples of such methods are: Rainbow Technologies' SentinelLM (a trademark of Rainbow), Marx Sofware's SoftSentry and Protection Plus (trademarks of Marx).

Current anti-pirating software methods within the art function as follows with a few minor twists. After the application is stored and executed onto the user's computer, the user will be provided with a generated parameter. The user is prompted to contact the vendor to exchange this parameter for a key. The user then enters the key into the system, which stores it into a hidden place(s). Some methods encrypt the key, and some do not. Some hide the key in many places, and some do not. Subsequent executions of the application verify that the key is found. If the key is not found, the user is denied access. The idea is that if the application is moved to another computer, the hidden key is not transferred. Therefore, on execution, the key is not found and access is denied. Such methods rely on authenticating registered users merely by detecting keys placed onto their system, and not authenticating the user's computer itself. Such methods suffer from the following limitations and problems, these methods are: 1) insufficiently secure, 2) the security level is static, and 3) not user-friendly for the user. In general, this is because of several drawbacks common to known anti-pirate software methods.

First, current methods rely on discriminating registered users from non-registered users by placing known values on the registered user's system—and not on discriminating a user's system itself from other systems. Second, current methods do not repeatedly authenticate the user's system itself—much less once—as the user requests access to the application. Third, current methods have an architecture that does not allow for the some functionality to be performed, at the user's system before the application is stored onto the user's system. This leads to several security risks, such as, the inability to ensure that the protected application is only sent to registered users in the first place. Furthermore, the current architecture makes it difficult, if not impossible, for these methods to have dynamic capabilities. Thus, security can not be individually tailored for each particular computer, but in fact is the same for any computer. Therefore, with current methods, a hacker may more easily develop and publish an application that will pirate any so enabled application on any computer. Finally, current methods do not have functionality that is invisible to the user—making such methods not user-friendly.

SUMMARY OF THE INVENTION

The objects set forth above as well as further and other objects and advantages of the present invention are achieved by the embodiments of the invention described hereinbelow.

A data value (herein a UMP) associated with, and determined on, a particular computer system is known within the computer art but not within the art of software anti-pirate methods. A UMP is not sufficient to uniquely identify a system from any other. The present invention acquires and utilizes sets of UMPs—which do uniquely identify a computer with respect to any other. Examples of UMPs are:

Hardware/physical parameters
Machine manufacturer/model
Machine serial number
Processor (CPU) version & stepping
Processor serial number
CMOS version
CMOS checksum
BIOS/ROM version
BIOS/ROM checksums
Hard disk manufacturer/model
Network Interface Card (NIC) MAC address
Machine IP address
Operating system manufacturer/model/version
Machine unique registry entries
Generated parameters
Custom registry entry Hidden files on disk Custom CMOS entry The invention collects a set of UMPs on the users' computer (or prospective user's computer) and sends this information to the server prior to the user obtaining the protected application (an application with is enabled by the invention)—to which the user is, or will be, licensed. The server application creates a single unique value, f(UMPs), from the set of UMPs. The server application then encrypts f(UMPs) once for each UMPs—using each UMPs. The protected application may then be encrypted by using the f(UMPs).

The server then sends the encrypted f(UMPs), and the encrypted protected application to the user's computer. After the payload is downloaded and executed, it authenticates the user's computer by generating the UMPs, and decrypting the encrypted f(UMPs) using the UMPs. If a given number, referred to herein as a "quorum," of identical f(UMPs)s is reached, then the f(UMPs) will be the same as was used to encrypt the protected application. The encrypted protected application is then decrypted using the f(UMPs) found in the quorum. If the quorum is reached, the protected application is successfully decrypted, and the encrypted f(UMPs)s are stored on the system. When the protected application is first executed, the invention generates a new set of UMPs, where each UMP is then used to decrypt the encrypted f(UMPs). If the computer is indeed the licensed computer, a quorum of identical decrypted f(UMPs) is reached (as before) and the user is allowed access to the protected application. Subsequent executions of the protected application generate new UMPs which are used to decrypt the set of encrypted f(UMPs) stored in a file within the protected application. If a quorum is deemed reached, the user is allowed access to the protected application. If a quorum is not reached, the user may be prompted to contact the vendor and/or the vendor may be automatically notified via the Internet or the like.

The current invention, as (very) briefly described above, has many aspects, which allow for a more secure, transparent, and customizable software anti-piracy method. Some of these aspects for preferred embodiments follow:

First, the invention is able to determine not just a single UMP from a user's computer, but in fact sets of UMPs from a user's computer before the protected application is stored on the user's computer. Collecting sets of UMPs allows for the unique identification of the user's computer itself, not keys or parameters stored on the user's computer. This also allows the invention to utilize a quorum condition, to be satisfied, before access to the protected application is granted to the user. Such a quorum can then be manipulated to allow the security level to be both customizable and variable. Second, the invention acquires sets of UMPs before the protected application is stored onto the user's computer. This allows for the authentication of a registered user before the protected application is sent to that user. Third, the invention allows for a dynamic capability, which makes it difficult—if not impossible—for a hacker to pirate one protected application, and use this method to pirate any other protected application. Finally, the method's system and components allow for transparent functionality—invisible to the user. This allows a software anti-piracy method that is not only more secure and customizable, but perhaps most importantly, one that is more user-friendly as well.

The complete description of the invention, and variations thereof, is explored below. For example, it may be desirable for the protected application to be delivered to the user on a compact disk, floppy, or other physical or electronic means.

Applying the invention to protect applications that are streaming data or data files—and the required changes of the invention under such cases—is also explored below.

For a better understanding of the present invention, together with other and further objects thereof, reference is made to the accompanying drawings and detailed description and its scope will be pointed out in the appended claims.

BRIEF DESCRIPTION OF THE DRAWINGS

The invention description below refers to the accompanying drawings, of which.

DETAILED DESCRIPTION OF AN
ILLUSTRATIVE EMBODIMENT

The vendor links a software library within a software product to enable it with the invention. Such an enabled software product will be called the 'protected application.' The library implements a number of functions that the invention calls. The invention's server and client applications are stored at the vendor's server computer. In embodiments of the present invention, the software may be written in virtually any programming language. For example, any of the many versions of the C language or Java, etc. The present invention can run on virtually any computing system: PC's, Mac's, Sun's, distributed systems joined over communication networks, etc., under any of the popular operating systems including: Unix, Windows 3x/NT/95/98, 2000, ME, CE, Mac, and DOS. The system must have access to or enough memory resident for storing the data described herein and for carrying out the processes and computations described herein, and the system must have access to suitable presentation equipment as known in the art.

Figure 1:
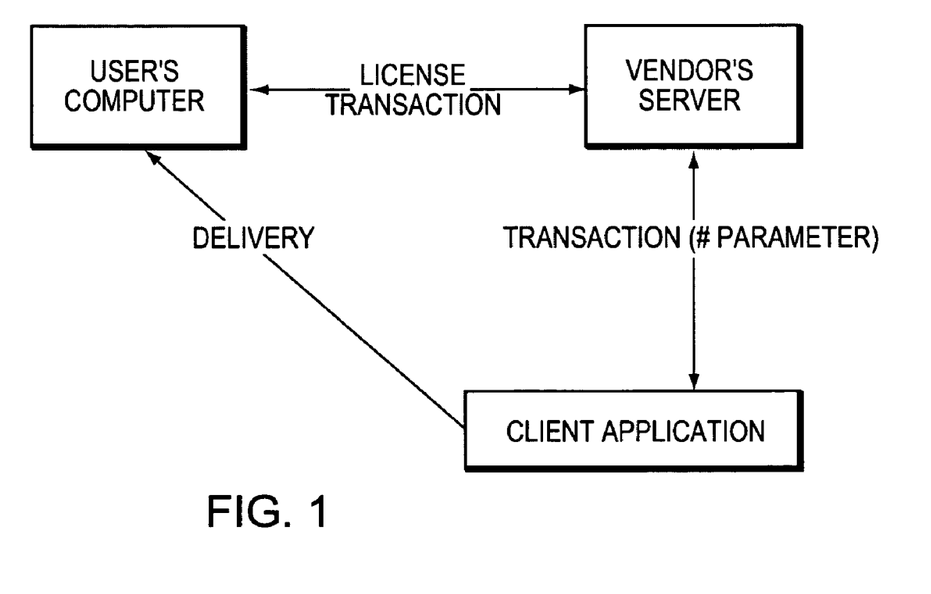
FIG. 1 is a block diagram of licensing transactions.

An individual becomes a 'user' of the protected application by completing a monetary transaction and/or executing a license agreement. After this (these) transaction (s) the server application imprints the client application with a sales number or similar transition parameter (FIG. 1) sufficient to uniquely identify that particular license event. The client application is then delivered to the user via email, a download, or by physical means such as on a compact or floppy disk.

(Alternatively, the client application may include functionality such that it itself may perform the monetary transaction and/or execute the license agreement in which case, the client application is already present on the user's computer. It is not necessary for the licensing to be accomplished at this point, but may be performed at any step in the process described herein.)

Execution of the Client Application

When the client application executes (see FIG. 2), it builds a list of UMPs to be calculated (i.e. a 'LUMP.' A LUMP is a list of UMPs to be calculated, and their instructions to do so. For example, the instructions to determine the IP address of a computer might be a member of an LUMP, and the actual IP address would be its corresponding UMP value.) and sends this, along with the order number that was imprinted into the client application, to the server application to be saved for later use. The client application will have a list of possible choices from which to select when creating LUMP. Some of these possible choices many not be appropriate for a particular computer because of its particular configuration.

Figure 2:
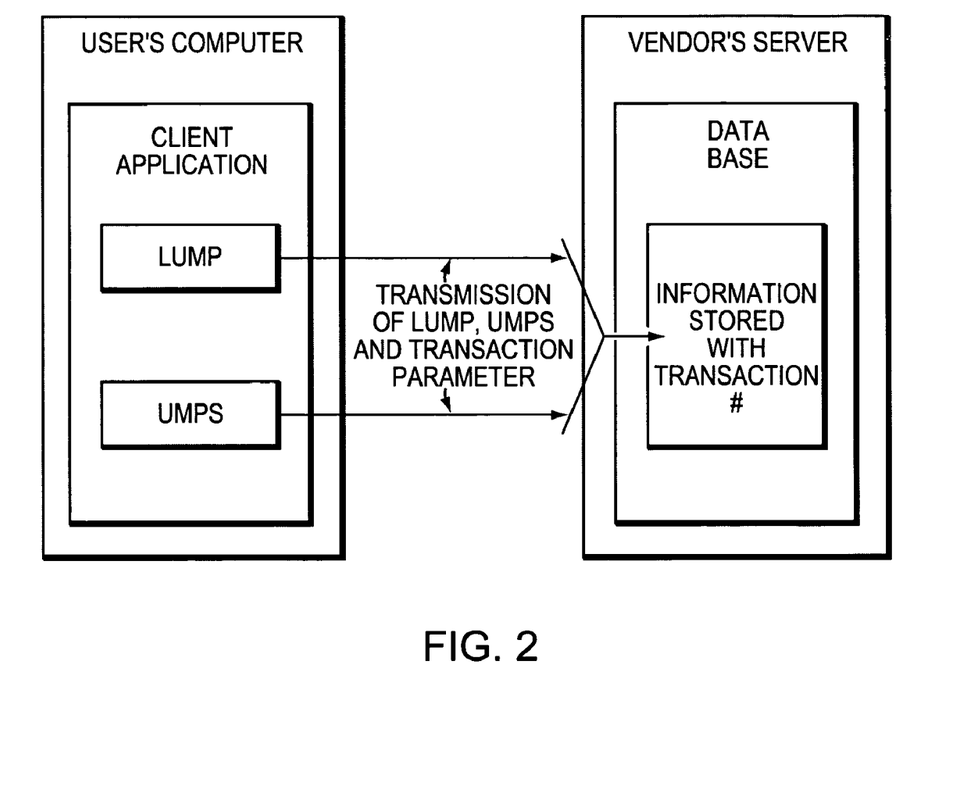
FIG. 2 is a block diagram/flow chart of steps used in preferred embodiment of the invention.

The client application then determines the UMPs and sends them to the server application to be stored. (Instead of determining a LUMP, the client application may simply generate the UMPs from a pre-determined LUMP.) These stored UMPs at the server will later be used to verify the authenticity of the user's computer (as opposed to non-licensed computers). A UMP is not truly unique, however; a sufficiently large set of UMPs is unique to one particular computer.

Creation and Encryption of f(UMPs)

Figure 3:
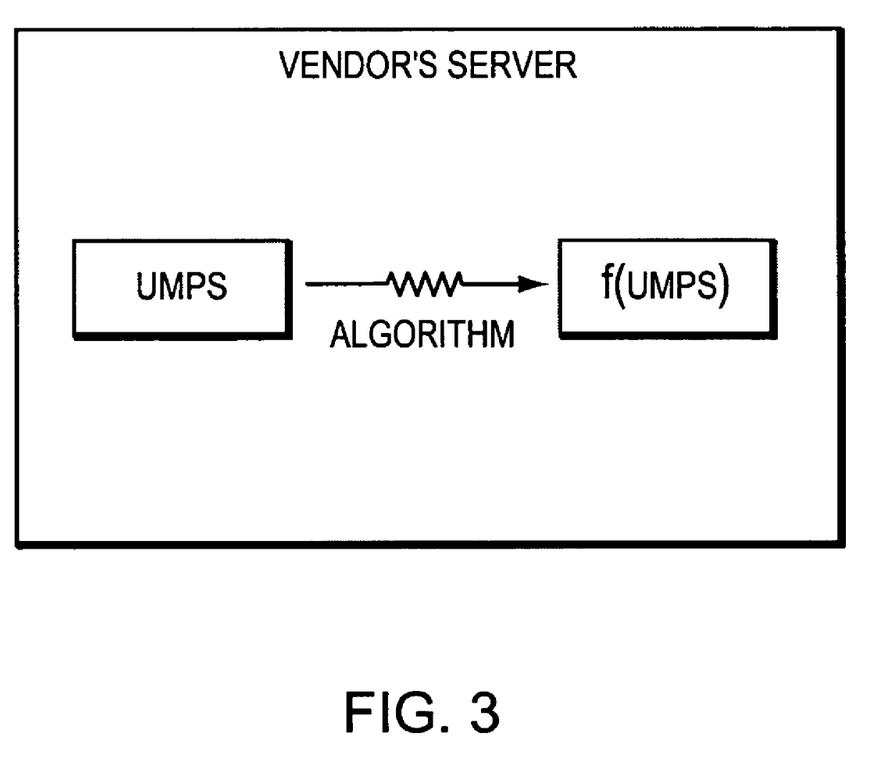
FIG. 3 is a flow chart of the algorithm operations.

The server application creates a single value by plugging the UMPs into an algorithm (see FIG. 3). We will refer to this single value as f(UMPs). The algorithm produces a mapping of UMP into f(UMPs) such that f(UMPs) would be different if any of the individual UMP values were different. The server application may cycle through many different algorithms to generate f(UMPs). This will help thwart hackers attempting to find a single relationship between the UMPs and f(UMPs).

Figure 4:
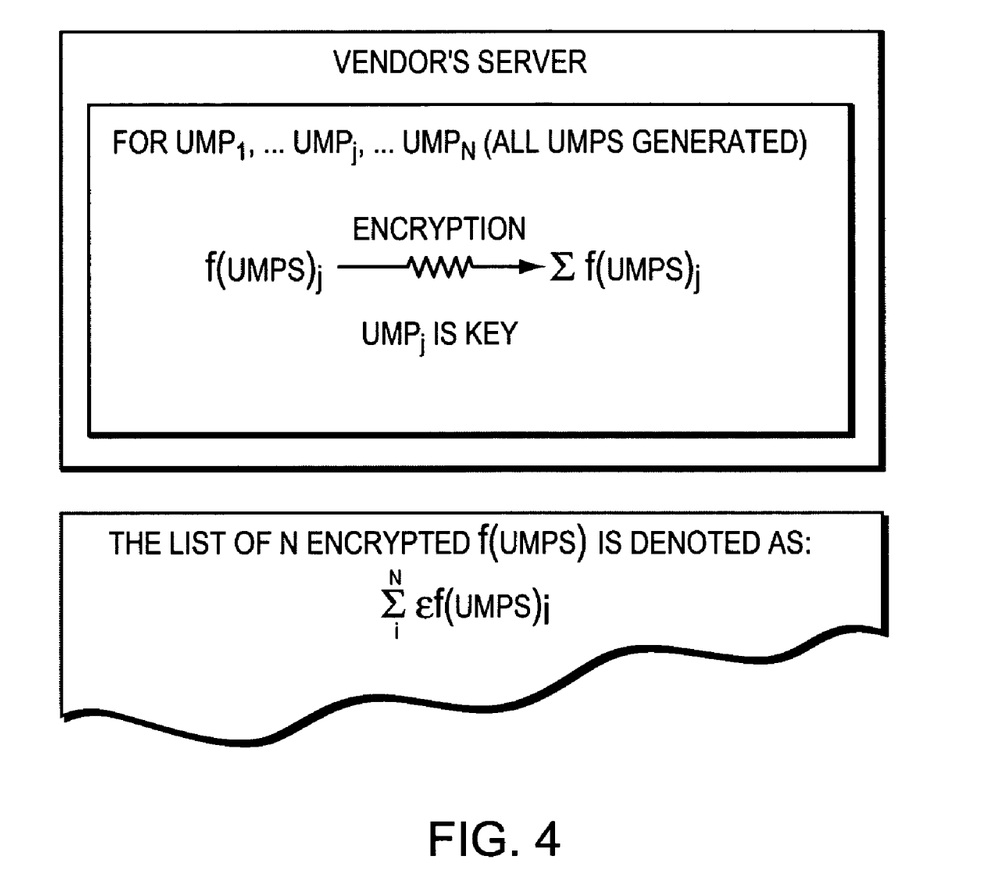
FIG. 4 is a flow chart of operations in a preferred embodiment of the invention.

The server application then encrypts f(UMPs) once for each of the entries in the LUMP using the corresponding generated UMP as the encryption key (see FIG. 4). The encryption algorithm may be one of a variety widely available. Examples of encryption algorithms are:

Blowfish
Twofish
DES
MD5
RC5 and, any of the RCA and PGP encryption programs readily available in the art.

See Bruce Schneier's book on this subject, Applied Cryptography, for a large number of practical algorithms (www.counterpane.com) known in the art.

Using a non-obvious method to cycle through the various encryption algorithms would help thwart hackers. We will refer to the entire set of encrypted values as $\Sigma\epsilon f(UMPs)_i$ [note: summation is not implied, rather, a listing is], and we will refer to a particular value as $\epsilon f(UMPs)_i$.

Creation and Delivery of the Loader

Figure 5:
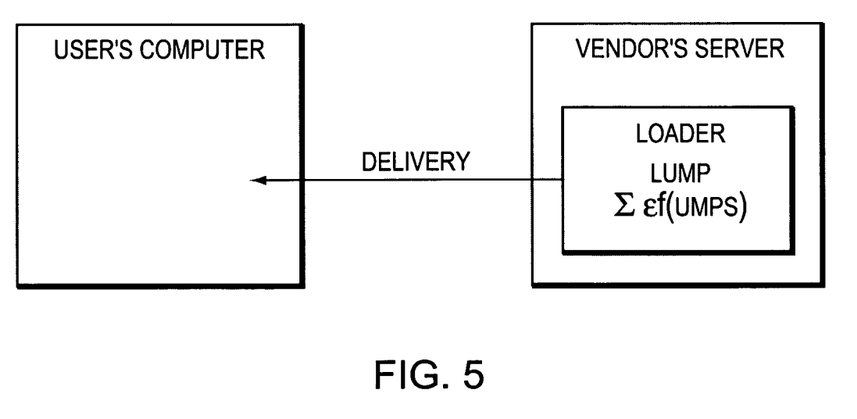
FIG. 5 is a diagram of further operations.

The next operation (see FIG. 5) the server must perform is to package the LUMP and $\Sigma\epsilon f(UMPs)_i$ into a single payload—a custom application loader (herein 'loader'). A loader is a common facility available on virtually all modern operating systems. Alternatively, the customer loader effect can be achieved by producing a software veneer that is applied to the payload. Examples of custom applications loaders are self extracting ZIP files and applications compressors (see www.webmedia.pl/wwpack32). The term loader will also refer to the first piece of the payload—an application that acts as the active portion of a self-extracting archive.

The client application may now start downloading the loader from the server to the user's computer. There exist a variety of download mechanisms within the art; however, the invention is most likely to use that found in the inventor's U.S. Pat. No. 6,049,892.

When the user starts, or resumes a paused or failed download, the client application authenticates the user's computer. This is accomplished by re-calculating the UMPs, and sending these along with the order number and LUMPs to the server where a comparison is made using the original value of these parameters which were stored at the server.

Execution of the Loader

Figure 6:
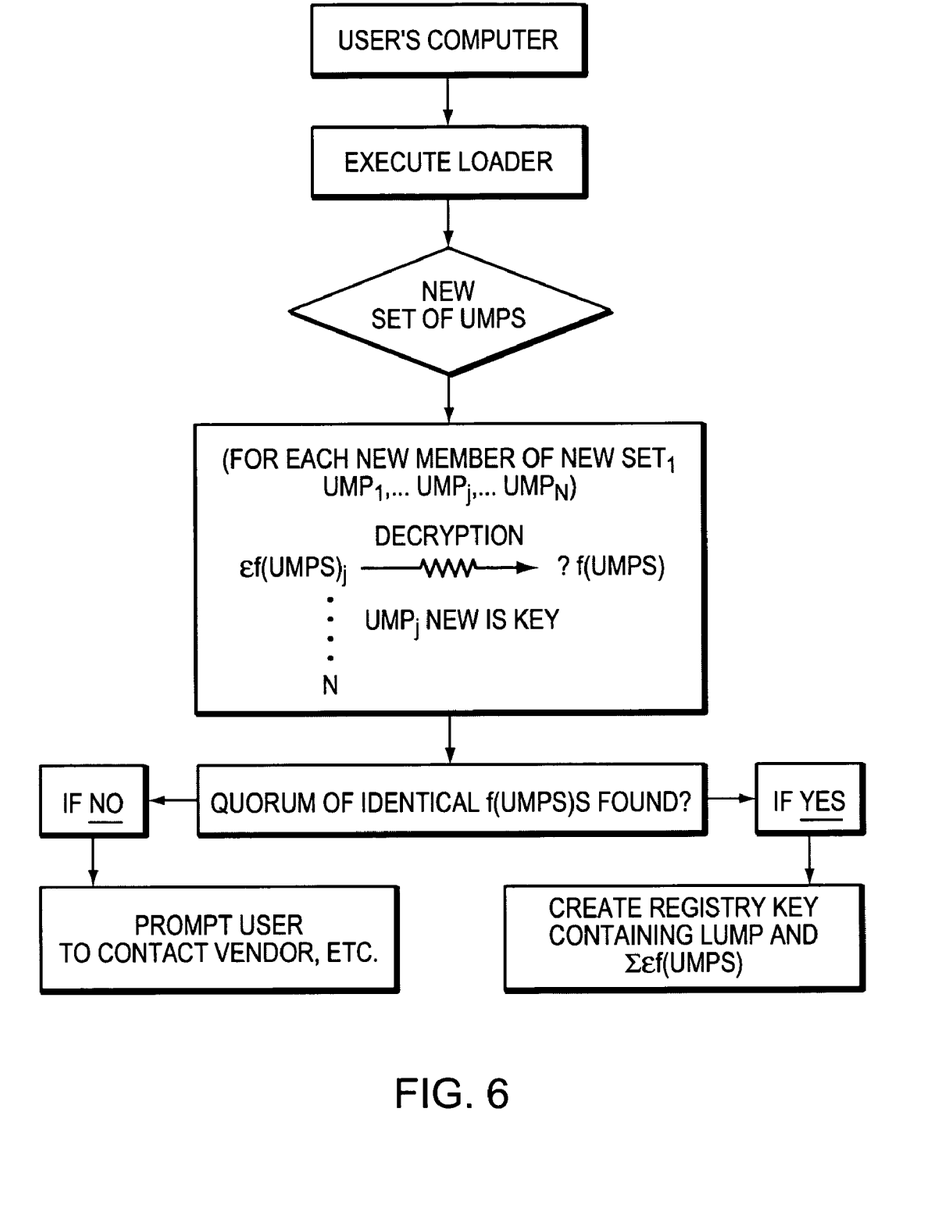
FIG. 6 is a diagram of yet further operations.

Once the client application completes the download of the loader, it begins execution of the loader and exits execution of itself (see FIG. 6). The loader reads the LUMP that was packaged within itself and determines the values of the UMPs. The loader then decrypts each of $\Sigma\epsilon f(UMPs)_i$ using the new UMPs as the decryption key. If the new $UMP_i$ is the same as the original $UMP_i$ that was used as the encryption key, then the result of the decryption will yield f(UMPs). If the new $UMP_i$ is different from the old $UMP_i$, the decryption yields a value other than f(UMPs).

The Loader's Quorum

After the entire set of $\Sigma\epsilon f(UMPs)_i$ is decrypted, the most common identical value is determined. If, and only if, the number of identical values meets a minimum level—a level pre-set by the vendor—a 'quorum' is deemed reached by the loader, the computer is assumed to be the user's computer, and the loader proceeds with creating a copy of the LUMP and the $\Sigma\epsilon f(UMPs)_i$ in the system registry under a key designated by the vendor. The protected application needs this information to ensure that it is executing on the user's computer (as opposed to an unlicensed computer). Copying this information into the registry places it in a location where the protected application will know where to look for it. This information will be used every time the protected application executes to verify that it is always executing on the user's computer.

Once the registry key is created, the loader communicates (e.g. email) to the vendor (or some other third party) that the user is ready to receive the protected application. Alternatively, the loader may simply prompt the user to contact the vendor.

If the quorum is not met, the loader assumes that it is not executing on the user's computer, and thus the $\Sigma\epsilon f(UMPs)_i$ and f(UMPs) are not copied into the registry, and a message is presented to the user to contact the vendor.

Delivery of the Protected Application

When the vendor (or other party) receives the email from the loader, the protected application may be written to a compact or floppy disk and sent to the user to be installed on the user's computer.

First Execution of the Protected Application

Figure 7:
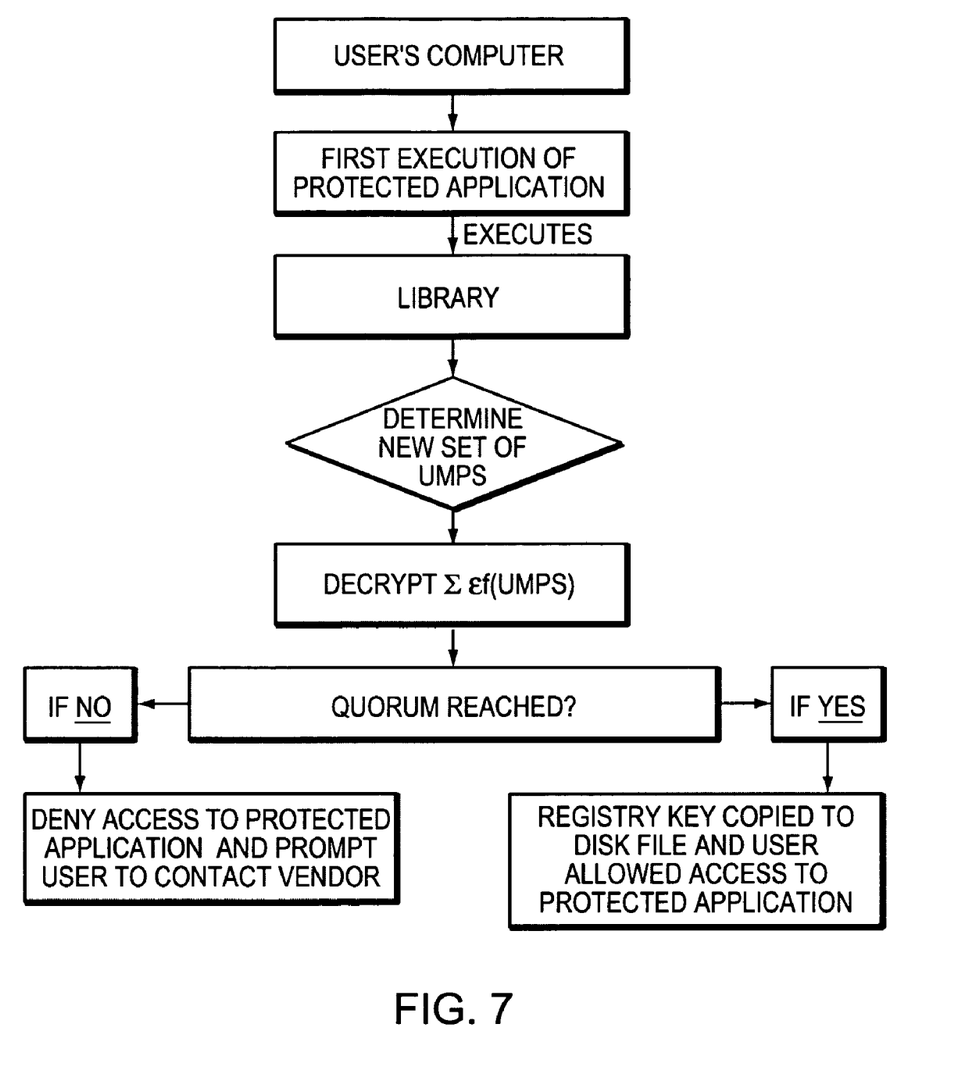
FIGS. 7, 8 and 9 are diagrams of hierarchical operations.

First execution of the protected application evokes the library of the present invention (FIG. 7). When the protected application is first executed, the key information (LUMP and the $\Sigma\epsilon f(UMPs)_i$) that was initially stored in the system registry, is copied by the library into a disk file that resides in the home folder of the protected application such that erasing this file will render the protected application unusable. Once copied, the registry keys may be deleted.

Next, the library generates new UMPs from LUMP, and then decrypts each of $\Sigma\epsilon f(UMPs)_i$ using the new UMPs as the decryption key. If, and only if, the new $UMP_i$ is the same as the original $UMP_i$ that was used as the encryption key, then the result of the decryption will yield f(UMPs). If the new $UMP_i$ is different from the old $UMP_i$, the decryption yields a value other than f(UMPs).

(Alternatively, the library may first perform the quorum check, and only if this is successful, is then the registry information copied to a disk file.)

The Library's Quorum

After the entire set of $\Sigma\epsilon f(UMPs)_i$ is decrypted by the library within the protected application, the most common identical value is determined. If the number of identical values meets a minimum level—a level pre-set by the vendor—a quorum is deemed reached by the library, the computer is assumed to be the user's computer, and the library allows access to the protected application.

If a quorum is not reached, the library presents the individual with an explanatory message, and instructions to contact the vendor.

Alternatively, the library presents the individual with instructions to connect the computer to the network (e.g. the Internet). Once connected, the library sends the sale parameter, UMPs, LUMP, $\Sigma\epsilon f(UMPs)_i$ and the time and date of the quorum failure (along with possibly other parameters such as the individual's mother's maiden name, and/or credit card information) to the server. This information is checked with that stored on a database at the server. If, and only if, the information checks to a degree prescribed by the vendor, then the individual is presumed to be an authenticated user whose UMPs is have changed over time such that the library has forbidden access to the protected application. In this case, the server sends loader' to the user. Loader' differs from loader in ways which will become apparent. After loader' is downloaded successfully by the library, it is executed. Loader' then generates the UMPs and sends these to the server where they are possibly compared again with the old UMPs, and a new set of LUMP and $\Sigma\epsilon f(UMPs)_i$ is generated and sent back to the library. This new set of $\Sigma\epsilon f(UMPs)_j$ and LUMP replaces the old sets. Now the user's LUMP has been effectively updated, allowing the user to access the protected application on his/her computer.

Subsequent Executions of the Protected Application

Every time the protected application is executed, the library will determine whether the protected application is executing on the user's computer or some other non-licensed computer (see FIG. 8) similar to the above. The library generates new UMPs from LUMP, and then decrypts each of $\Sigma\epsilon f(UMPs)_i$ using the new UMPs as the decryption key. If the new $UMP_i$ is the same as the original $UMP_i$ that was used as the encryption key, then the result of the decryption will yield f(UMPs). If the new $UMP_i$ is different from the old $UMP_i$, the decryption yields a value other than f(UMPs).

Figure 8:
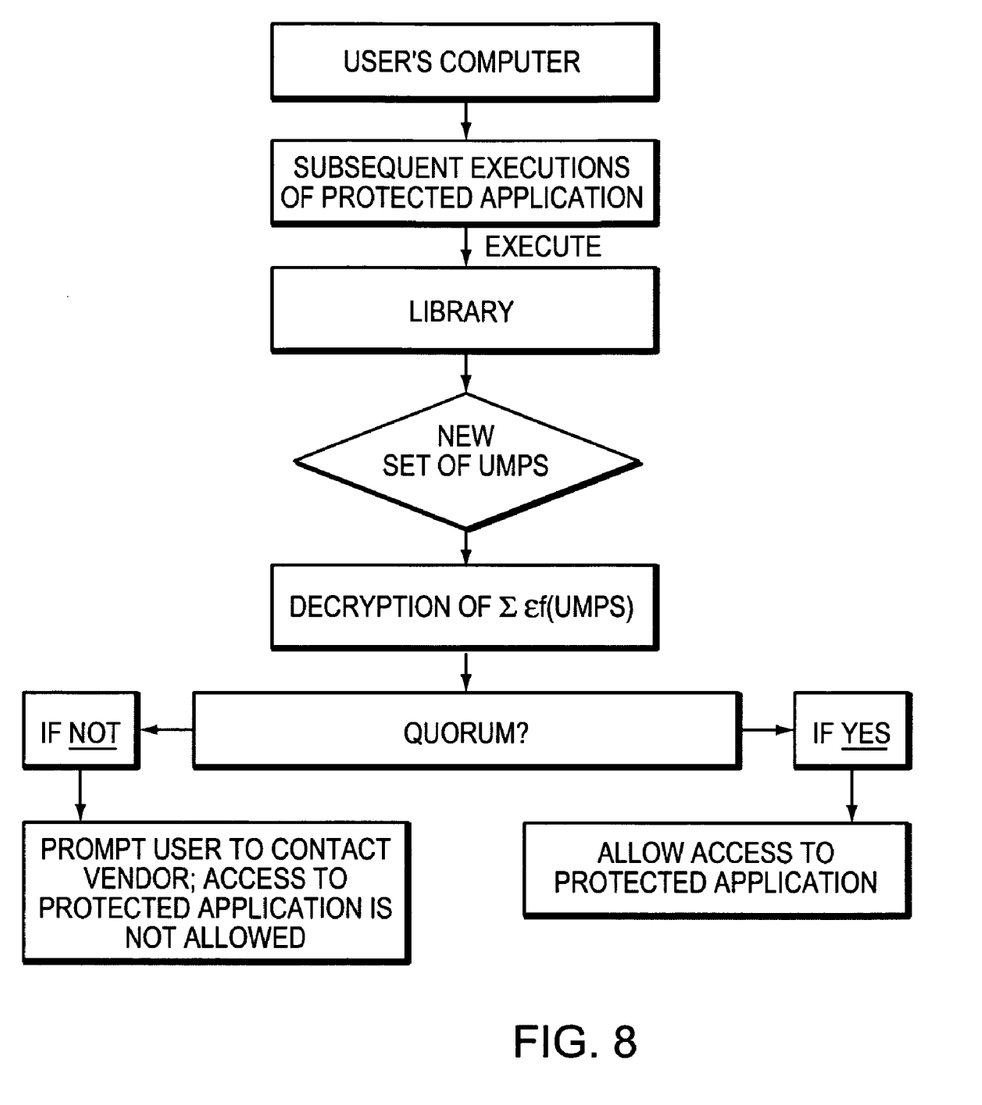

After the entire set of $\Sigma\epsilon f(UMPs)_i$ are decrypted, the most common identical value is determined. If the number of identical values meets a minimum level—a level pre-set by the vendor—a quorum is deemed reached, the computer is assumed to be the user's computer, and the library allows access to the protected application. If a quorum is not reached, a message is displayed to contact the vendor, or the alternative method described above where the individual's computer is instructed to connect to the network (e.g. the Internet).

Note: A 'final' protected application may be within the 'protected application' described above. This presents no difficulties. For example, the original protected application may be a self-extracting archive. When inflated, the resultant includes a set-up program that when activated installs the application the vendor wishes to protect. In this case, it's the installed application that is now the 'protected application' described above and below, since execution of it evokes the library of the present invention.

Note: It may be desirable to skip the creating the of the f(UMPs). In this case the server simply encrypts each UMP, and packages these encrypted UMPs, along with the encryption key(s), into the loader. After generating a new set of UMPs on first execution or thereafter, the quorums are then based upon finding a pre-set number of UMPs matches.

Note: The quorum used by the library may be different than the quorum used by the loader. Also, it may be desirable to have the quorum (especially the one used by the library) vary with respect to some parameter, for example, allowing the quorum to relax with time thereby requiring a lesser number of identical decrypted values in order to allow access to the protected application. This would account for the changing environment of a user's computer—new disk space, operating system, etc.—yet allow for the access of the protected application.

Electronic Delivery of the Protected Application

The loader may contain the protected application. In this case, when the set of $\Sigma\epsilon f(UMPs)_i$ is constructed at the server, the protected application may also be encrypted (which we will denote $\epsilon$protected application) using the f(UMPs) as the encryption key.

Figure 9:
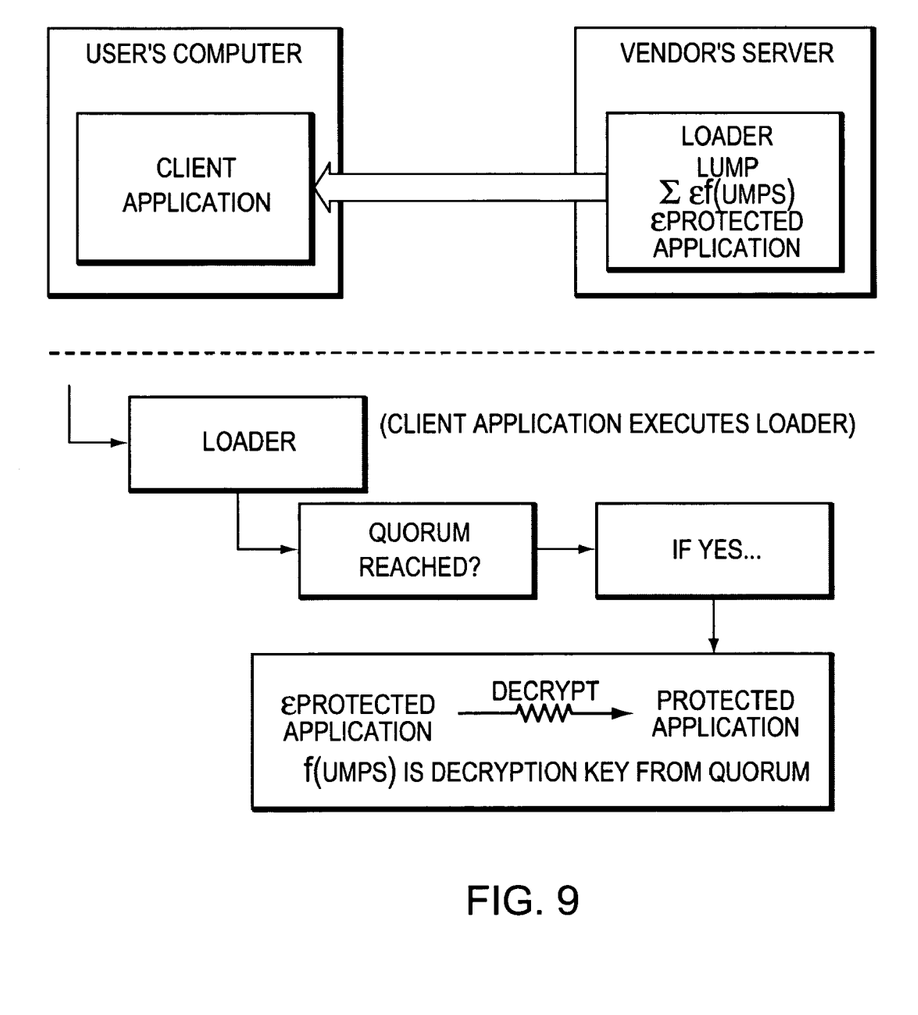

Since the loader now contains $\epsilon$protected application, when the client application downloads the loader, the now encrypted protected application is downloaded to the user as well. As above, the client application executes the loader and exits execution itself. In this case, if the quorum requirement is reached, the resultant f(UMPs) is used as the decryption key to decrypt $\epsilon$protected application. As above, the loader then copies $\Sigma\epsilon f(UMPs)_i$ and LUMP into a registry key, to be picked up by the protected application in its first execution (see FIG. 9). (Alternatively, the $\epsilon$protected application may be decrypted at the second quorum performed by the library, and not by the loader.)

One of the encrypted UMPs should be the identification of the protected application itself. The quorum evaluator within the loader must ensure that this particular UMP decrypts correctly. If this check is not made it may be possible for a hacker to acquire a legitimate LUMP and $\Sigma\epsilon f(UMPs)_i$ of one protected application, and use them to access another protected application for which the hacker is not licensed.

When the Protected Application is a Data File(s)

Thus far, the protected application is assumed to be an executable of some kind. Suppose the protected application is a data file processable by another application, which we will call a 'player.'

In this case, the loader contains an encrypted data file with an extension that is recognizable to the invention (say ethos). The player has within it the linked library of the present invention. (It may be desirable to also embed the client application of the invention within the player.) The library is modified in the following manner: 1) the library is able to recognize the ethos file extension, and 2) the library is able to decrypt the data.ethos file as it is reading and displaying it, and 3) the linked library may, or may not, allow saving the decrypted data.ethos file.

The loader functions in the usual method. When the player attempts to process the data.ethos file for the first time, it obtains the registry key information. If the quorum is met within the library, the resultant f(UMPs) is used to decrypt the encrypted data.ethos file as it is read by the player. The library may function such that the player can not save a copy of the now decrypted data.ethos file. (The vendor of the player may choose to relax this specification). Once the data.ethos file is terminated, the decrypted copy is simply erased leaving the original encrypted file—thus no encryption is necessary. In such an arrangement, the invention will ensure that licensed users only process the data- .ethos file in the following manner.

Alternatively, the library may be entirely contained within a 'plug-in' application the is distributed independent of the player. The plug-in would make the association of the data.ethos file to the player and perform all the steps that the library would.

When the Protected Application is Streaming Data

If the protected application is a stream of data, slight modifications of the invention, described thus far, are required. The client application will be contained within the player. Thus, when the player is instructed to download and process a protected application, the client application within the player is invoked. The loader in this case, does not contain the εprotected application. If the loader quorum is met, (and the registry key is made) the client application is allowed to access the server to start the download of εprotected application. The beginning of the εprotected application file contains the library. When the client application receives the library, it is executed by the client application. If the quorum of the library is reached, the client application will successfully decrypt the incoming streaming data of εprotected application as described above. The client application then sends the decrypted incoming streaming data of the protected application to the appropriate resource in the player to be processed.

It may be desirable to skip the loader entirely. In this case, there is no registry key entry, and there exists only one quorum—that of the library. The beginning of the εprotected application streaming file would then contain the registry information. In this case, it also may be desirable to have the library not within the first part of the εprotected application streaming file, but linked within the player instead.

The download functionality of the client application will contain aspects of that found in the inventor's U.S. Pat. No. 6,049,892. Therefore, should the stream of data terminate, the client application within the player will (if need be) reconnect the user's computer to the network. Once the connection is re-established, the client application will authenticate the user's computer as done above. If this verification is successful, the client application resumes transmission of the stream of data at the precise place where it left off. This would allow for stringent copyright terms, e.g. only a one execution of the protected application by the player.

Multi-User Licenses of the Protected Application

This section describes how the present invention is applied to licenses for multiple users. This situation is important within the corporate environment, where MIS personnel sets up licenses of software, or other potential protected applications, for multiple users within the corporate network.

A 'master user' receives a 'master-client application' (herein master-client). The master-client is a version of the client application which has the capacity to list multiple users ($n_1, n_2, \ldots, n_j, \ldots n_n$) to be licensed with the protected application. This information is collected by the master-client and included within the usually information sent to the server as above, however note that in general there will be $n_n$ order numbers. The server (or the master-client) then sends an email to those users listed by the master user. These emails contain a 'n-client application' (herein n-client) as an attachment. When user $n_j$ executes the n-client, it performs as the client application above. (Note: in this case the n-client $n_j$ for user checks under the $n_j$ entry within the master user's information file stored at the server.)

If user $n_j$ is authenticated, the n-client downloads the n-loader. In this case, the n-loader may not contain the protected application. Should the n-loader's quorum be reached, among the usually tasks performed, it sends a message to the master user/vendor/or other server site, that user $n_j$ is ready for the protected application which is then sent via a compact or floppy disk or by other physical means.

Alternatively, the protected application may be included within the n-loader (analogous to above). In this case it will have been downloaded to the $n_j$ user.

When the protected application is executed, it invokes the linked library of the invention as described above. Should the quorum be reached, the $n_j$ user is allowed access into the protected application as described above.

Alternatively, the master-client application may send, rather than an e-mails as mentioned above, a URL to $n_1$, $n_2, \ldots, n_j, \ldots n_n$. In this case, the URL will allow users to go to a special portion of the server to download the n-client. This would allow the master-user to pre-purchase/pre-license a multiple user licenses. Then, at the download area of the server, only a pre-set number of n-clients will be available to be downloaded.

Although the invention has been described with respect to various embodiments, it should be realized this invention is also capable of a wide variety of further and other embodiments within the spirit and scope of the appended claims.

What is claimed is:

1. A process for protecting a software product, sent from a server computer to a computer, from unauthorized usage, the process comprising the steps of:

generating a first set of parameters from the computer before the software product is encrypted at the server, sending the first set of parameters to the server computer before the software product is encrypted at the server, creating, at the server computer, a single value from the first set of parameters before the software product is encrypted at the server, encrypting, at the server computer, the software product by using the single value as the encryption key, sending the encrypted software product to the computer, encrypting, at the server computer, the single value by using members of the first set of parameters as encryption keys, to form a set of encrypted single values, sending the set of encrypted single values to the computer, generating a second set of parameters from the computer, decrypting members of the set of encrypted single values using members of the second set of parameters as decryption keys, determining, at the computer, from the decrypted members of the set of encrypted single values, the single value, and decrypting the encrypted software product by using the single value as the decryption key.

2. The process of claim 1 wherein the software product comprises at least one data file or streaming data or both.

3. A process for protecting a software product, sent from a server computer to a computer, from unauthorized usage, the process comprising the steps of:

generating a first set of parameters from the computer before the software product is encrypted at the server, sending the first set of parameters to the server computer before the software product is encrypted at the server, creating, at the server computer, a single value from the first set of parameters before the software product is encrypted at the server, encrypting, at the server computer, the single value using members of the first set of parameters as encryption keys, to form a set of encrypted single values, sending the set of encrypted single values to the computer, sending the software product to the computer, generating a second set of parameters from the computer, decrypting, at the computer, members of the set of encrypted single values by using members of the second set of parameters as decryption keys, determining, at the computer, from the decrypted members of the set of encrypted single values, the single value, and authorizing access to the software product at the computer.

4. The process of claim 3 wherein the software product comprises at least one data file or streaming data or both.

5. The process of claim 3 further comprising the step wherein if the said determination yields a quorum of identical single values, then authorizing access to the software product at the computer.

6. A process for protecting a software product, sent from a server computer to a computer, from unauthorized usage, the process comprising the steps of:

generating a first set of parameters from the computer before the software product is encrypted at the server, sending the first set of parameters to the server computer, before the software product is encrypted at the server, creating, at the server computer, a single value from the first set of parameters, before the software product is encrypted at the server, encrypting, at the server computer, the single value by using members of the first set of parameters as the encryption keys, to form a set of encrypted values, sending the set of encrypted single values to the computer, sending the software product to the computer, generating a second set of parameters from the computer, decrypting members of the set of encrypted single values by using members of the second set of parameters as the decryption keys, determining, at the computer, from the decrypted members of the set of encrypted single values, the single value, and authorizing the execution of the software product on the computer.

7. The process of claim 6 further comprising the step wherein if the said determination yields a quorum of identical single values, then authorizing the execution of the software product on the computer.

8. The process of claim 6 wherein the software product comprises at least one data file or streaming data or both.

* * * * *